No. 767,661. PATENTED AUG. 16, 1904.
F. REED.
NUT LOCK.
APPLICATION FILED JAN. 25, 1904.
NO MODEL.

Witness
John Floyd Cross
Haskell Hooter

Inventor
Frank Reed

No. 767,661. Patented August 16, 1904.

UNITED STATES PATENT OFFICE.

FRANK REED, OF SCRUBGRASS, PENNSYLVANIA.

NUT-LOCK.

SPECIFICATION forming part of Letters Patent No. 767,661, dated August 16, 1904.

Application filed January 25, 1904. Serial No. 190,629. (No model.)

*To all whom it may concern:*

Be it known that I, FRANK REED, a citizen of the United States, residing at Scrubgrass, in the county of Venango and State of Pennsylvania, have invented a new and useful Nut-Lock, of which the following is a specification.

My invention relates to a new spring nut-lock especially adapted to railroad-rail splice-plates to prevent the nut from unscrewing by the action of passing trains. I attain this object by the mechanism illustrated in the accompanying drawings, in which—

Figure 2:
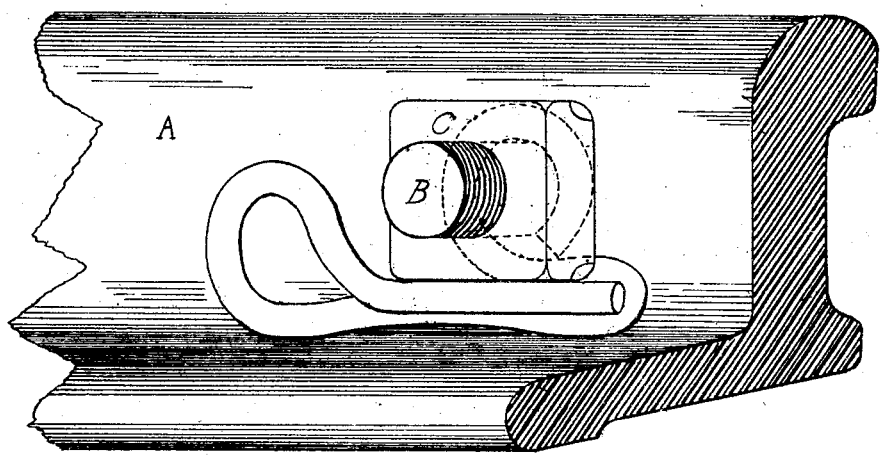
Figure 1:
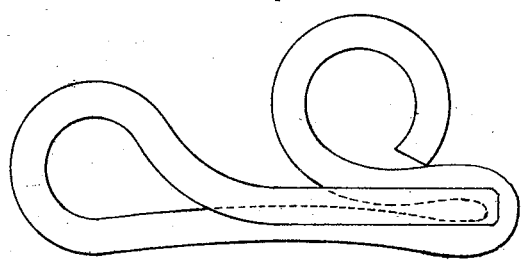

Figure 1 is an outline of the entire nut-lock and can be made in the following manner by using square, round, or octagon spring-steel: First turn an open eye, then a curve to the right, then a much longer curve to the left of the eye or washer, bringing the end under the eye across the first turn, thus forming the lock. Fig. 2 is a nut-lock in position.

A is part of a rail-splice used on T-rails; B, bolt in rail and splice-plate; C, nut with chipped corners. The chipped corners of the nut allow it to turn without forcing the spring down on the flange of the splice-plate. Hexagon or octagon nuts can be used with the same results.

I do not claim to be the originator of the open-eye or washer part of the nut-lock.

What I do claim as my invention, and desire to secure by Letters Patent, is—

The herein-described nut-lock consisting of a strip of metal having a looped portion adapted to embrace the bolt, and having an extended portion to the right and downward to the shoulder of fish-plate or splice, thence returning along the shoulder and forming a perpendicular loop to the left of the bolt, the end continuing and ending under the nut on the outward side of the before-named portion along shoulder of splice, the hexagon or cornered nut allowing proper room for the upward and downward movements of the end, thus forming the nut-lock, substantially as shown for the purpose specified.

In testimony whereof I have signed my name to this specification in the presence of two subscribing witnesses.

FRANK REED.

Witnesses:
PRESLEY NEWMAKER,
ELMER MCCLINTOCK.